July 17, 1956  R. DAUB  2,755,151
PISTON STRUCTURE
Filed May 29, 1952  2 Sheets-Sheet 2
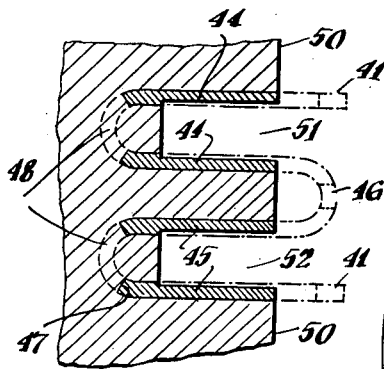
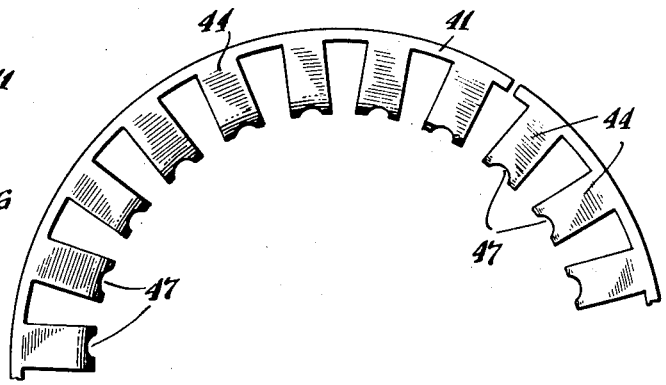
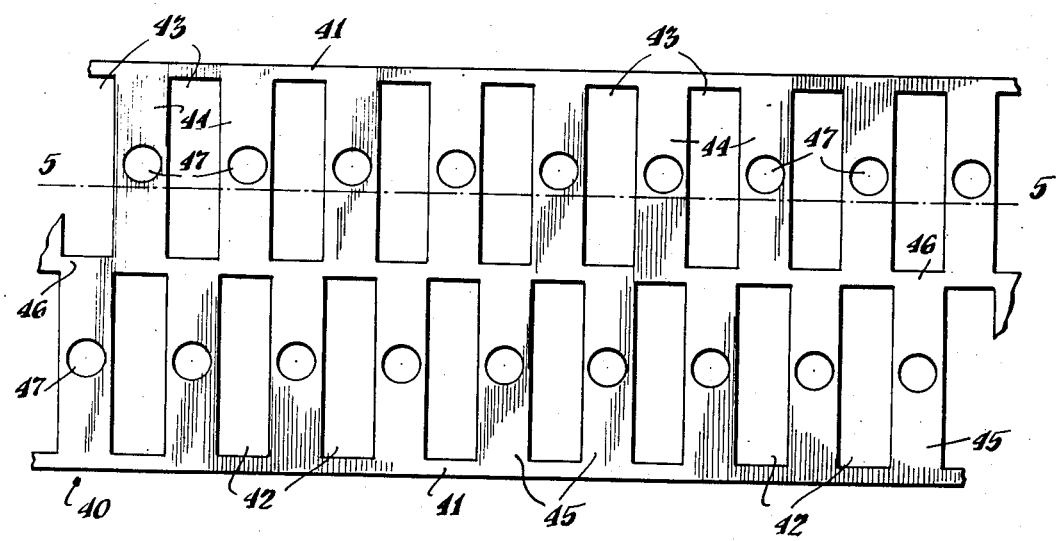
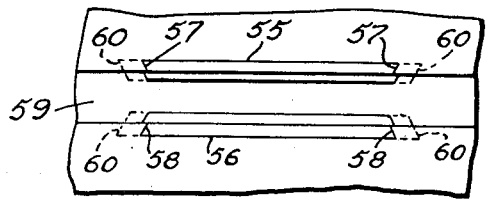
INVENTOR.
Rudolph Daub
BY
Frank A. Bower
ATTORNEY

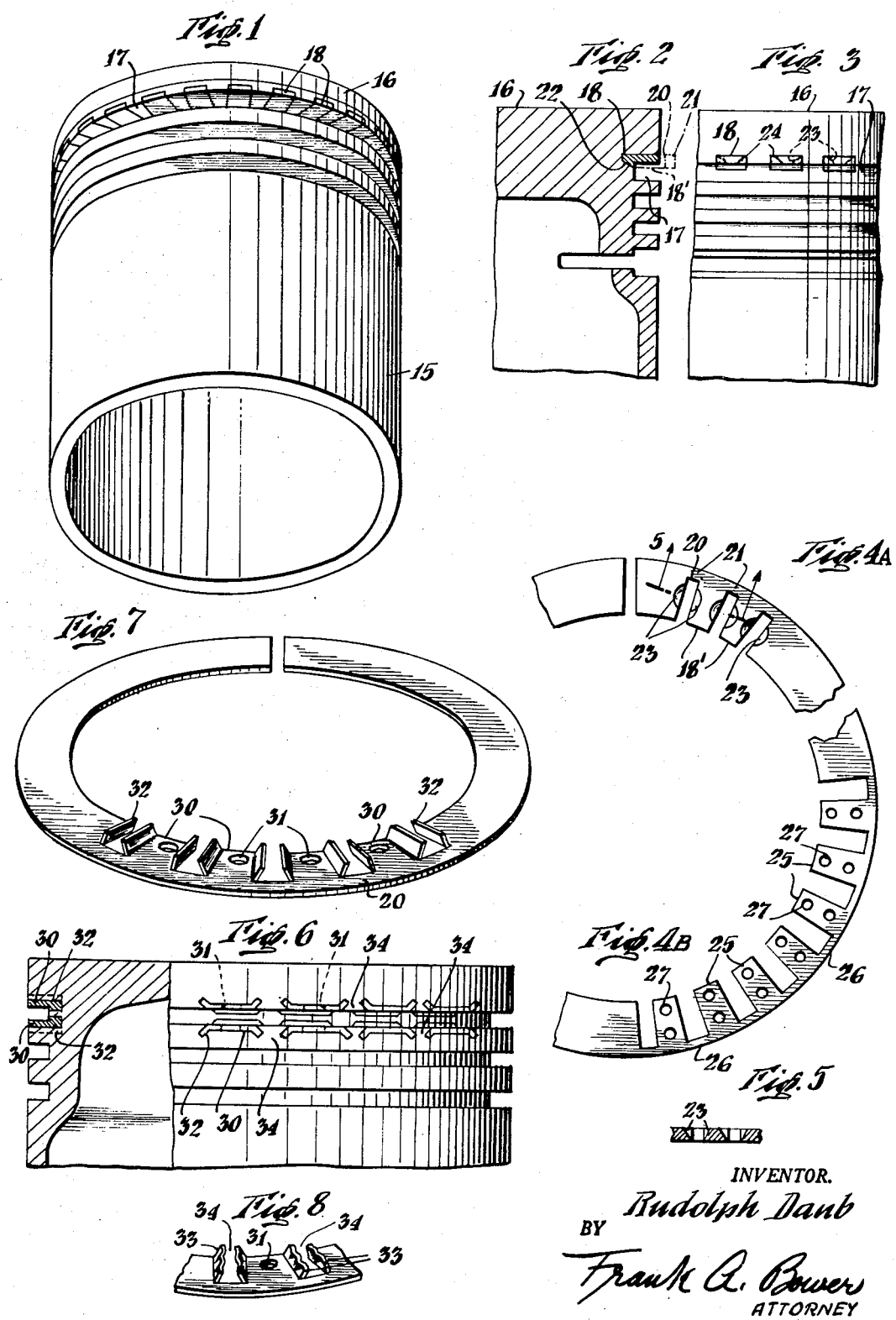

United States Patent Office 2,755,151
Patented July 17, 1956

2,755,151

PISTON STRUCTURE

Rudolph Daub, West Caldwell, N. J., assignor of twenty per cent to Frank A. Bower, New York, N. Y.

Application May 29, 1952, Serial No. 290,738

14 Claims. (Cl. 309—14)

This invention relates to piston structures and particularly to pistons of internal combustion engines.

The object of the invention is to provide a piston structure simple and inexpensive in manufacture and having surfaces of the piston grooves reinforced by hard metal wear plates distributed flatwise around the piston in a plane normal to the piston axis and anchored in place in the metal of the piston.

Further objects of the invention particularly in the formation of the plates to provide specially shaped parts for secure anchorage in the lighter metal of the piston will appear in the following specification taken in connection with the accompanying drawing in which Fig. 1 is a perspective view of a piston structure having a wall of a groove provided with wear plates in accordance with this invention;

Fig. 2 is a partial radial section on enlarged scale of the piston structure of Fig. 1 illustrating the reinforcement and the method of formation thereof;

Fig. 3 is a partial elevational view of the piston shown in Figs. 1 and 2;

Fig. 4-A is a partial plan view of a portion of a ring illustrating a modified formation of reinforcing plates for casting in the piston structure of Figs. 1, 2 and 3. Fig. 4-B is a partial plan view of a further modification of a ring illustrating the formation of reinforcing plates in accordance with this invention;

Fig. 5 is a partial sectional view of a ring taken on line 5—5 of Fig. 4-A;

Fig. 6 is a partial elevational view of another piston structure of this invention partly in section;

Fig. 7 is a perspective view of a ring with wear plates for the structure of Fig. 6, the partial showing of the wear plates being illustrative of the formation which extends around the entire ring;

Fig. 8 is a partial perspective view of a modified plate ring of the type illustrated in Figs. 6 and 7;

Fig. 9 is a partial sectional view of a further modified piston structure of this invention taken in a radial plane through the piston axis;

Fig. 10 is a partial plan view on reduced scale of a continuous metal strip formed to be bent into the ring form illustrated in Fig. 11 to provide the series of wear plates shown in the piston structure of Fig. 9;

Fig. 11 is a plan view of the strip structure curved into a circular formation before casting; and Fig. 12 illustrates another embodiment of metal expanding in width in an inward direction and having sloped edges.

In the embodiment of the invention shown in Figs. 1 to 3 the piston 15 has head 16 and head groove 17 provided at its upper face with wear plates 18 cast in place in the metal of the piston.

These plates 18 are separate in the final piston structure shown and their spacing in even sequence around the groove 17 is attained by forming them as a continuous sequence of plates in an integral strip having a radial section outlined at 20 in dot and dash lining in Fig. 2.

A straight strip has a continuous edge portion 21 with plates 18' projecting from it on one side in evenly spaced sequence and with their ends beveled as indicated at 22. The strip 20 is then bent into circular form (similar to Fig. 4) corresponding to the diameter shown in Fig. 2 and is supported in place in the mold so as to have the aluminum alloy metal of piston 15 cast around the plates 18', the edge strip 21 connecting plates 18' being preferably around the outside of the piston periphery as indicated in Fig. 2. Then, upon machining of the piston grooves, the ring or rim 21 is cut away and the plates 18' are cut on the outer edge and under surfaces to correspond to the grooving as shown in full line sectioning in Fig. 2.

Preferably the plates 18' will have recesses for better securing them in place in the alloy. For instance, as illustrated in Fig. 4-A, conical cut-outs 23 are made at the under surfaces of opposite edges of the plates and in the casting operation metal will flow into these recesses 23 so as to form underlying lips 24 of alloy on each side (Fig. 3).

These plates 18 are thus independent of each other imbedded in the alloy of the piston and preferably provided with interlocking protrusions of the alloy such as lips 24 securing them against release. The piston ring of groove 17 bears against the plates 18 and the groove surfaces between them, and these groove surfaces, due to expansion at higher temperatures, tend to bulge slightly between the plates and are correspondingly worked against the hard upper surface of the piston ring and skin-toughened in very desirable manner. Thus the lips 24 under the plate edges will be strengthened and pressed into close contact with the recesses 23 and at the same time are strengthened and hardened.

Similarly where, as indicated in Fig. 4-B, the plates 25 joined by rim 26 of the initial strip have recesses in the form of holes or orifices 27, these are filled with the alloy during casting and the metal protruding into the holes provides a composite surfacing of the plates in the groove with skin-hardening and toughening of the alloy surfaces under the hammering of the hard piston ring.

As illustrated in Fig. 7, the plates 30 in addition to holes 31 may have plain flanges 32 or ruffled flanges 33 (Fig. 8) diverging outward at any angle forming the alloy intrusions in the final piston into dovetails 34 between the plates and underlying the flanges and presenting flat surfaces to the hammering hardening action of the piston ring.

A further modification of the piston groove structure is shown in Fig. 9 providing successive groove facings from a specially formed strip as illustrated on reduced scale in Figs. 10 and 11. The flat strip 40 (Fig. 10) has edge rims 41 left by the punching out of rows of spaces 42, 43 preferably in relatively staggered relation as shown so that each space 42 is in transverse alignment with a plate portion 44 between spaces 43 and similarly each space 43 is in transverse alignment with a plate portion 45 between spaces 42. A narrow center rib 46 separates the strip into two similar parts on opposite sides of the center line. The plate portions 44, 45 are preferably punched out with holes 47 along lines nearly central of the plate ends in position to provide openings for the flow of the piston metal at 48 between the inner ends of the plate portions 44, 45 in the piston structure (Fig. 9).

The strip 40 (Fig. 10) is bent transversely into W-shape in section as indicated in Fig. 9 and formed into a circular shape (Fig. 11) corresponding to the piston periphery 50 so that the rims 41 protrude beyond the periphery in the mold with the central rib 46 between them. These protruding portions are shown in dot and dash lines in Fig. 9 and after casting of the piston metal are machined away to have the separate plates 44, 45 imbedded in the metal of the grooves 51, 52, the plates of each respective groove being joined by the U-bends containing the holes 47 through which the piston metal flows as illustrated at 48. With the double strip 40, the rims 41 may be omitted and the straight flat strip punched with the plates 44, 45 protruding oppositely from the center rib 46.

In Fig. 12 the hard metal inserts or pieces are illustrated with their edges 57, 58 cut at angles spreading to greater width within the seat in the metal on each side of the groove 59 so that they are retained against axial movement. Similarly these inserts are slightly tapered to less width at their outer ends from an intermediate point 60 so as to be retained against radial outward movement.

Instead of a double row of plates 44, 45, a strip may be formed with only a single row of plates between the edge rims, the strip being of a width corresponding to a single U-bend (Fig. 9) and providing plates above and below for the faces of a single groove. Or the strip may be further reduced to a single rim 41 and protruding plates 44 shortened to line 5—5 to just contain the holes 47, these ends being bent to U-formation adapted to serve as anchorages in the piston metal for the plates 44 in the upper or lower surface of the groove.

The system of this invention provides a very simple, adaptable, and effective reinforcement applicable to one or more of the piston groove surfaces with no substantial increase in cost and adding greatly to the life of the piston and with improvement in the sealing action in the cylinder.

This case is a continuation in part of my co-pending application, Serial Number 225,533, filed May 10, 1951, now Patent No. 2,685,729.

I claim:

1. A piston structure comprising a generally cylindrical piston head, a piston ring groove in said head and a series of separate, unconnected reinforcing groove facing units of flat, plate metal pieces independently cast in the metal of said piston as facings of groove surfaces and seated in shallow recesses therein having unit supporting surfaces in planes normal to the axis of the piston and each unit having means interlocking axially with the metal of the piston to retain it against dislodgement or loosening in service.

2. A piston structure as set forth in claim 1 in which the interlocking means comprises an orifice extending through the reinforcing unit in a direction parallel to the axis of the piston.

3. A piston structure as set forth in claim 1 in which the interlocking means comprises an integral extension of the reinforcing unit imbedded in the metal of the piston.

4. A piston structure as set forth in claim 1 in which the interlocking means comprises a side flange at the edge of the unit and imbedded in the metal of the piston.

5. A piston structure as set forth in claim 1 in which the interlocking means comprises strip portions connecting a pair of the units and imbedded in the metal of the piston.

6. A piston structure as set forth in claim 1 in which the interlocking means includes an integral connecting strip between the reinforcing units of the same groove and imbedded in the metal of the piston.

7. A piston structure as set forth in claim 1 in which the interlocking means comprise undercut edges imbedded in the metal of the piston.

8. A piston structure as set forth in claim 1 in which said axially interlocking means comprises a surface on said metal piece inclined to the plane of said piston ring groove and facing said groove and a generally wedged-shaped portion of said piston head positioned between said surface and said groove to receive the hammering of a piston ring in said groove to maintain the wedged shaped portion in tight contact against said surface retaining the metal piece in position.

9. A piston structure as set forth in claim 1 in which said axial interlocking means comprises an edge having a surface inclined to provide for overlapping of the insert by the metal of the piston.

10. A piston structure as set forth in claim 1 in which said axially interlocking means on each unit comprises a surface inclined to the facing of said groove and facing said facing to overlap said surface to lock said unit.

11. A piston structure as set forth in claim 1 in which radial locking means are provided to radially retain said metal pieces.

12. A piston structure as set forth in claim 11 in which said radial locking means comprises axially extending surfaces in said metal pieces and portions of said piston head having a configuration of said axial surface to interlock said metal piece with said piston head.

13. A piston structure as set forth in claim 11 in which said configuration comprises a hole through said piece.

14. A piston structure as set forth in claim 13 in which said hole is cylindrical in shape and a cylindrical plug formed as a single piece with said piston head and extending through said hole to tightly lock said metal piece from relative radial movement.

References Cited in the file of this patent

UNITED STATES PATENTS

| 2,148,423 | Blettner | Feb. 28, 1939 |
| 2,244,954 | Lenz et al. | June 10, 1941 |
| 2,255,006 | Graham | Sept. 2, 1941 |
| 2,278,958 | White | Apr. 7, 1942 |
| 2,550,879 | Stevens | May 1, 1951 |

FOREIGN PATENTS

| 251,127 | Great Britain | Apr. 29, 1926 |
| 548,400 | Great Britain | Oct. 8, 1942 |
| 642,042 | Great Britain | Aug. 23, 1950 |
| 455,539 | France | Dec. 13, 1913 |
| 897,373 | France | Mar. 20, 1945 |